April 23, 1968     L. J. MELHART     3,379,997

MAGNETOHYDRODYNAMIC LIGHT SOURCE EXCITED LASER

Filed March 19, 1964

INVENTOR
LEONARD J. MELHART

BY    *Melvin L. Crane*    AGENT

*Richard Reed*    ATTORNEY

United States Patent Office

3,379,997
Patented Apr. 23, 1968

3,379,997
MAGNETOHYDRODYNAMIC LIGHT SOURCE
EXCITED LASER
Leonard J. Melhart, 6511 Abbington Drive,
Oxon Hill, Md. 20021
Filed Mar. 19, 1964, Ser. No. 353,306
8 Claims. (Cl. 331—94.5)

ABSTRACT OF THE DISCLOSURE

The device of this invention makes use of a magnetohydrodynamic type light source for exciting a laser etalon. The device includes a cylindrical envelope with a concave end and a flat end. Electrodes secured to the concave end and connected electrically to a capacitor source produces a light source upon discharge of the capacitor source. The light is directed over a laser element secured within the envelope. Light produced by the laser element is directed out through an aperture within the envelope.

The present invention is directed to a light source and more particularly to a ilght source suitable for excitation of a laser element such as a solid state etalon.

Heretofore flash lamp light sources for laser elements have been in the form of elongated lamps parallel to the axis of the laser elements, spiral lamps that are spiraled around the length of the laser element, or a plurality of lamps of different types. The light source of the present invention is of a coaxial type in which the light from the source surrounds the laser element along the length thereof to excite the laser element.

It is an object of the present invention to provide a laser excitation light source which is of simple construction, which will have long life without cracking or rupture of the envelope.

Another object is to provide a coaxial light source to excite a laser element.

Still another object is to provide a light source for exciting a laser element within the same envelope.

Other and more specific objects of this invention will become apparent upon a more careful consideration of the following detailed description when taken together with the accompanying drawing, in which.

This invention is directed to a magnetohydrodynamic type light source coupled axially with a laser etalon within an envelope to excite the laser. A capacitor discharge across spaced electrodes produces a radial light which is magnetically formed along the laser element positioned relative thereto within an envelope. A part of the envelope is formed by a portion of one of the electrodes that produces the light source.

Figure 1:
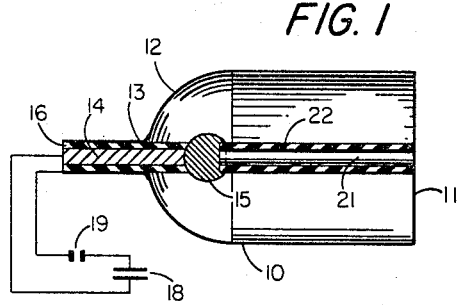
FIG. 1 illustrates a linear cross sectional view of the relative parts of the device made in accordance with the present invention.

Referring now to the drawing, wherein like reference characters represent like parts throughout, there is shown by illustration in FIG. 1 suitable structure for producing a light suitable for excitation of a solid state laser etalon. The structure includes a cylindrical envelope 10 having a flat end plate 11 perpendicular to the linear axis and an opposite concave end 12 of substantially a semispherical shell of electrically conductive material. The concave end 12 forms an electrode which is secured to the outer conductor 13 of a coaxial cable of which is insulated center conductor 14 extends into the envelope along the linear axis. A solid spherical electrode 15 as shown connects with the conductor 14 on the linear axis of the chamber and is so positioned that a plane perpendicular to the envelope axis along a diameter of the semispherical concave electrode 12 is tangent to the outer surface of electrode 15. However, the spherical electrode can be shifted in either direction and function just as well.

The conductor 14 is insulated from the electrode 12 by the insulation 16 about the center conductor and the insulation extends along the conductor to the connection of the electrode 15 to prevent a discharge between the center conductor 16 and the concave electrode 12. A capacitor source 18 is connected to the coaxial cable and controlled by a suitable spark gap switch 19.

A solid state laser etalon 21 which has a protective sleeve 22 of quartz or other transparent material thereon is positioned between the center spherical electrode and the flat end plate 12 of the envelope perpendicular to the linear axis thereof. An axial aperture is made in the flat end plate of comparable diameter as the laser element to permit light produced by the laser element to emerge from the device.

The laser element and sleeve are connected to the end plate by any well known means and the elements are suitably sealed for vacuum operation by suitable vacuum seals.

The inner cylindrical surface of the cylindrical envelope may be polished or made reflective in order to reflect light back onto the laser element to insure the greatest amount of light for excitation of the laser also, a gas such as zenon may be introduced in the envelope for increased light. This gas is maintained generally in the range of 1 to 10 millimeters of mercury pressure.

In operation, the chamber is evacuated and maintained at the desired pressure either by sealing off the envelope or by admitting the gas through a calibrated leak while pumping out the chamber with a vacuum pump. The capacitor source is charged sufficiently to discharge across the spark gap switch or the spark gap switch may have a means for causing a discharge across the switch at a desired time. The current from the capacitor is directed to the light source electrodes where the discharge causes a spark circumferentially around the center electrode to the outer electrode. Once the circuit is completed by the spark a magnetic field is produced about the outer electrode between the coaxial cable connection and the point of contact by the spark. The magnetic field forces the spark away from the outer electrode and blows the spark along the length of the laser etalon. The intense light excites the laser which produces a light beam emission through the aperture in the end plate of the envelope. The repetition rate of the emitted light from the laser etalon depends on the charging rate of the capacitors and the triggering rate. Since the spark between the electrodes of the light source arrangement is along the circumference of the center electrode and since the magnetic field "blows" the spark away the circle of smallest radii on the center electrode to a circle of greatest radii. Thus, the electrode will not erode and cause contaminants within the envelope. The polished inner surface of the envelope will reflect light back onto the laser element to increase the total light around the laser element and further excitation of the laser.

As is well known in the art, the laser etalon will have a fully reflecting mirror at the end adjacent to the center electrode and a partially reflecting mirror at the end connected to the end plate at therein.

Figure 3:
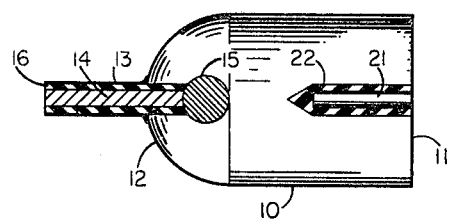
FIGS. 3 and 5 are modifications of FIG. 1.

FIGURE 3 is directed to a modification wherein the laser etalon is secured to the end plate of the envelope with the partially reflecting end at the aperture in the end plate. The fully reflecting mirrored end is spaced from the center electrode 15 with the protective sleeve on the laser element taking the shape of a cone at one end to direct the light emitting plasma around the laser element.

Figure 2:
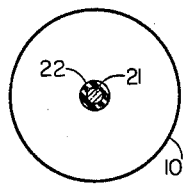
FIG. 2 is a cross sectional view of the device shown in FIG. 1 perpendicular to the length.
Figure 4:
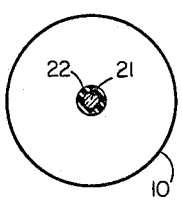
FIGS. 4 and 6 are cross sectional views of FIGS. 3 and 5, respectively.

FIGURES 2 and 4 are cross sectional views through the devices as shown respectively in FIGURES 1 and 3 looking toward the flat end plate of the envelope.

Figure 5:
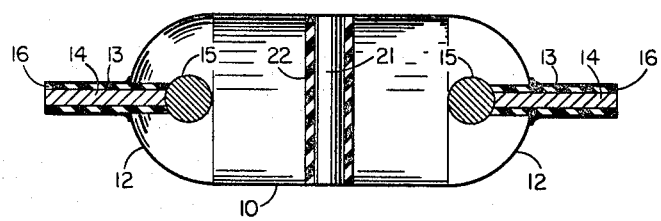

FIGURE 5 is another modification illustrating the use of a light source at opposite ends of an envelope with the laser etalon perpendicular to the linear axis of the envelope and positioned midway between the light source electrodes at each end of the envelope. In this modification, the spark will be forced from each end of the envelope toward each other meeting at the middle of the envelope about the laser etalon to provide sufficient light to excite the laser. The sides of the envelope to which the laser is connected is provided with an aperture approximately equal in diameter to the diameter of the laser element to permit the light to emerge from the laser element.

Figure 6:
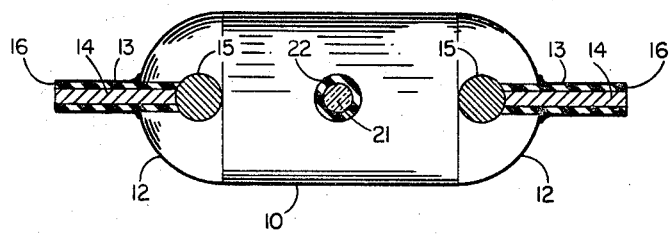

FIG. 6 is a cross sectional view of the device shown in FIGURE 5 which illustrates the relative parts of the device.

In operation, a capacitive source of 150 μfd. at 5 kilovolts will provide a light source of 1800 joules around the laser etalon which is sufficient to excite the laser element. The arrangement of the light along the length of the laser element insures that light of equal intensity is on the entire circumference of the laser element along the entire length which is the most ideal situation for exciting the laser action.

The voltage range for this device is between approximately 1 kv. and 50 kv. At the lower voltage range prior art trigger electrodes would be introduced through the concave electrode to insure the electrical breakdown of the gas.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:
1. A light source device for laser excitation which comprises:
   an envelope,
   said envelope having a linear axis,
   said envelope including a flat end surface perpendicular to the linear axis thereof and an electrically conductive concave end surface at the opposite end from said flat end surface,
   said flat end surface including an aperture centrally located therein concentric with said axis,
   a coaxial cable,
   said coaxial cable including an outer conductor and an inner conductor separated by an insulation,
   said outer conductor connecting electrically with said concave end surface near the axis thereof,
   said inner conductor and said insulation thereon extending through said concave end surface beyond said outer conductor and into said envelope along said linear axis thereof, said inner conductor being separated from said concave end surface by said insulation,
   a spherical electrode connected with the end of said inner conductor and positioned on said linear axis of said envelope within said concave surface,
   and a cylindrical chamber within said envelope positioned along the linear axis thereof and secured to said flat end surface in alignment with said aperture in said flat end surface for receiving a laser etalon therein.

2. A light source device for exciting a laser which comprises:
   a cylindrical envelope,
   said envelope having a linear axis,
   said envelope including a flat end surface perpendicular to the linear axis of said envelope and an electrically conductive concave end surface at the opposite end from said flat end surface,
   said flat end surface and said concave end surface including an aperture centrally located therein concentric with said axis of said envelope,
   a coaxial cable,
   said coaxial cable including an outer conductor, an inner conductor and an insulation separating said outer conductor from said inner conductor,
   said insulated inner conductor of said coaxial cable extending beyond said outer conductor into said envelope through said axial aperture in said concave end of said envelope and insulated from said end surface by said insulation,
   said outer conductor connecting electrically with said concave end of said envelope,
   a spherical electrode connected with the end of said inner conductor of said coaxial cable extending into said envelope through said aperture in said concave end and positioned on said linear axis within said envelope,
   and, a cylindrical chamber secured along the axis of said envelope between said spherical electrode and said flat end surface in alignment with said aperture in said flat end surface for receiving a laser etalon therein along the linear axis of said chamber.

3. A light source device as claimed in claim 2 in which the inside surface of said concave end and said cylindrical section of said envelope is light reflective.

4. A light source device as claimed in claim 3 in which the envelope contains a gaseous filling.

5. A light source device as claimed in claim 2 which includes a laser element within said chamber coaxial therewith, said laser element being secured at one end thereof to said spherical electrode and at the opposite end to the flat end surface of said envelope.

6. A light source device as claimed in claim 5 wherein said laser is separated from said spherical electrode and secured at one end thereof to said flat end plate in alignment with said aperture in said flat end surface.

7. A light source device for laser excitation which comprises:
   an envelope,
   said envelope having a linear axis,
   said envelope including a cylindrical portion and oppositely disposed electrically conductive concave ends with the concave surfaces facing each other,
   each of said concave ends including an aperture therein on the axis of said envelope,
   a pair of coaxial cables,
   each of said coaxial cables including an outer conductor, and inner conductor and an insulation separating said outer conductor from said inner conductor,
   said insulated inner conductor and insulation of each of said coaxial cables extending one each into said envelope beyond said outer conductor through said axial apertures in each end surface along said linear axis of said envelope,
   said outer conductor of one coaxial cable connecting electrically with one end surface of said envelope and the outer conductor of the other of said pair of coaxial cables connecting electrically with the opposite end surface of said envelope,
   separate spherical electrodes connected electrically with the inner end of each of said inner conductors of said pair of coaxial cables that extends into said envelope through said axial apertures in said concave ends, with said spherical electrodes spaced from the end surface adjacent thereto along said linear axis of said envelope, a laser etalon positioned normal to the linear axis of said envelope at the midpoint between said concave ends, and equally spaced from said spherical electrodes, and an aperture in the wall of said envelope in alignment with the ends of the laser etalon to permit emergance of light from the laser etalon.

8. A light source device as claimed in claim 7 wherein said envelope has a light reflective coating thereon and a gas filling in said envelope.

References Cited

UNITED STATES PATENTS 3,265,989   8/1966   Gurs _____ 331—94.5

JEWELL H. PEDERSEN, *Primary Examiner.*

R. L. WIBERT, *Assistant Examiner.*